Figure 1A:
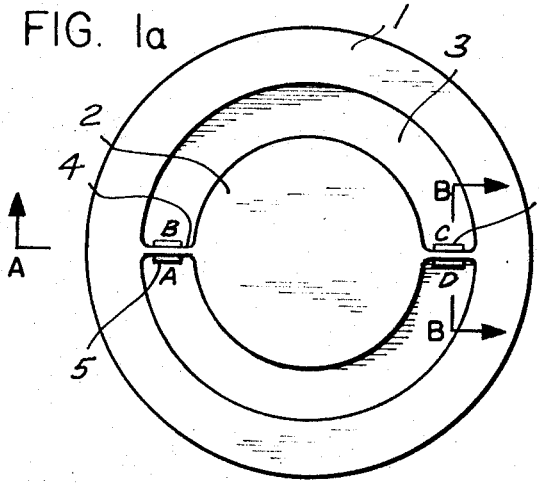

United States Patent [19]
Andersson

[11] 3,869,906
[45] Mar. 11, 1975

[54] ELEMENT APPLICABLE AS OR IN A TRANSDUCER (LOAD CELL)

[75] Inventor: John Erik Andersson, Karlskoga, Sweden

[73] Assignee: Aktiebolaget Bofors, Bofors, Sweden

[22] Filed: Dec. 26, 1972

[21] Appl. No.: 318,413

[52] U.S. Cl............ 73/141 A, 73/88.5, 73/398 AR, 338/4
[51] Int. Cl. ............................................. G01l 5/12
[58] Field of Search.......... 73/398 AR, 141 A, 88.5; 338/4, 41, 42

[56] References Cited
UNITED STATES PATENTS

| | | |
|---|---|---|
| 3,037,178 | 5/1962 | Pien ............................. 73/398 AR |
| 3,196,676 | 7/1965 | Pien ..................................... 338/4 |
| 3,365,689 | 1/1968 | Kutsay ............................. 73/141 A |
| 3,413,845 | 12/1968 | Pugnaire ....................... 73/398 AR |
| 3,696,317 | 10/1972 | Farr ................................ 73/141 A |

Primary Examiner—Donald O. Woodiel
Attorney, Agent, or Firm—Hane, Baxley & Spiecens

[57] ABSTRACT

A transducer device includes an outer member and an inner member coaxially spaced from the outer members, the members being connected via a membrane integral with the members at one of their end faces. A plurality of strain-gauge-supporting laminar beams are spaced around the annular gap between the members and connected thereto with the planes of the beams being perpendicular to the plane of the membrane.

10 Claims, 16 Drawing Figures

Section A-A

Section B-B

Section C-C

Section D-D

3,869,906

ELEMENT APPLICABLE AS OR IN A TRANSDUCER (LOAD CELL)

The present invention relates to an element applicable as or in a transducer, preferable as a pressure transducer for measuring gas and liquid pressure. The element comprises a tubular outside member and an inside member coaxially attached to an outside member via a membrane in one of their ends. The element is also provided with at least two shear strained beams extending between the members and supporting strain gauges. The beams are disc shaped and applied edgewise perpendicular in relation to the membrane. The element can be included in a special unit which is applied to the measuring object in question, but can also be used more or less as a separate unit which is housed by the measuring object, which then is constructed for such an attachment.

An object of the element according to the invention is to create a mechanically rugged transducer element which also is simple in construction and cheap in manufacturing.

A second object of the invention is to attain an element suitable for usage in damp, dusty or in other ways troublesome regions. When used for measuring of pressures of liquids and gases, even corrosive ones, the demands for chemical durability on the element are very high. In the latter case it is important that the strain gauges are protected from the gas or the liquid, i.e. the element must comply with the demands for hermetically sealed strain gauges when the element is used for measuring differential pressures.

A third object of the invention is to eliminate all kind of junctions in the element, which junctions cause such phenomena as creeps, hystereses, increased deflections, deviations in temperature etc. The device according to U.S. Pat. 3,413,845 illustrates an example of an element which is provided with many junctions, which, thus, will be eliminated by the invention. Compared with the device of the mentioned patent the element according to the present invention operates with a thinner membrane, which decreases the force shunting effect of the membrane. A smaller force shunting influence implies less sensitivity in the encasing procedure. For example, the parts of the element according to the mentioned patent have to be manufacturated with a very great accuracy, which is not necessary in the present invention.

A fourth object of the invention is to make possible a very low pressure transducer. A low pressure transducer has great advantages e.g. in earth pressure measuring.

A fifth object of the invention is to create a special kind of transducers suitable for a large measuring range, such as 5–200 Kp/cm². For example, the device of the mentioned patent appears to cover only the measuring range just below and around 5 Kp/cm².

The element according to the invention can also be used when there is a demand for a small internal volume, small changes in internal volume, a large effective area, high natural frequency, overload protection and/or cooling. Because of these latter demands, elements comprising some sort of bending stressed beams will not be useful in this connection.

The most outstanding characteristics for the present invention in relation to the already known elements are that the shear strained beams are adapted for standing against the membrane, that the beams also are integrated parts of the membrane and the outside and the inside members and that the membrane is made comparatively weak.

Figure 1B:
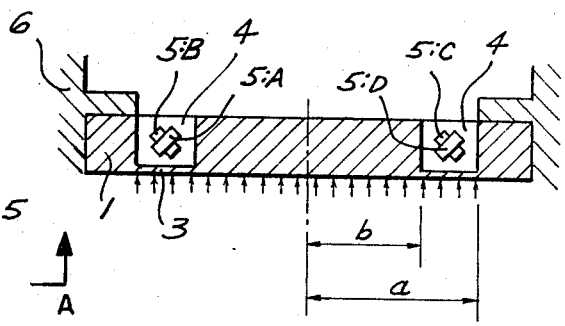
Figure 1C:
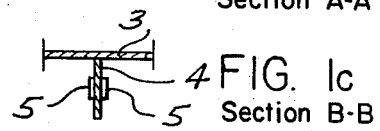
Figure 3:
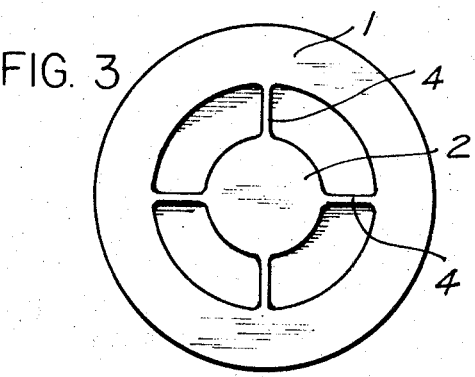
Figure 2:
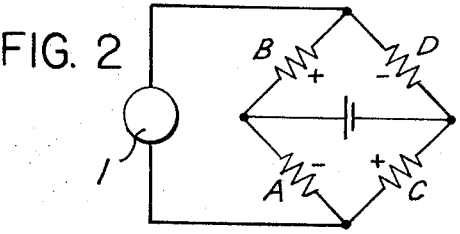
Figure 4:
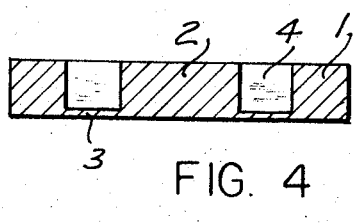
Figure 5:
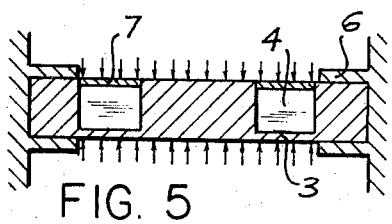
Figure 6:
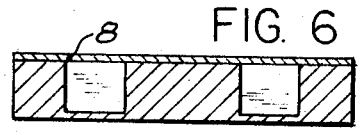
Figure 7:
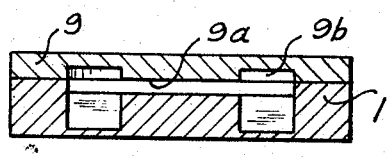
Figure 8:
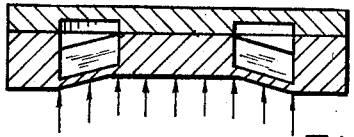
Figure 9:
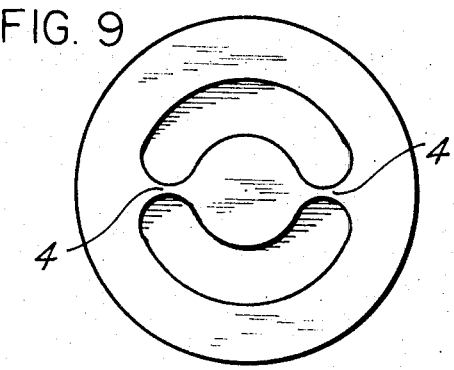
Figure 10:
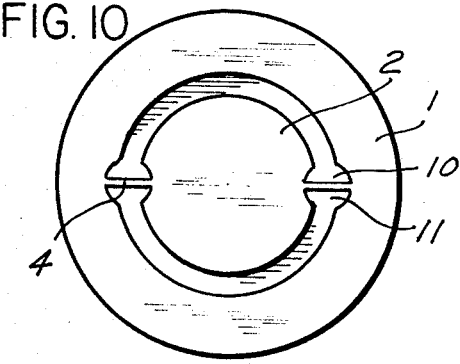
Figure 11A:
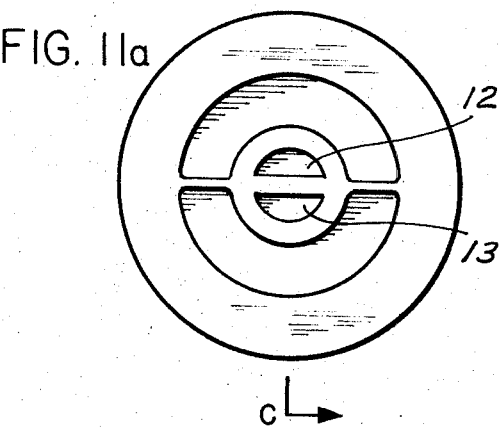
Figure 11B:
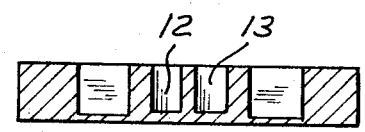
Figure 12B:
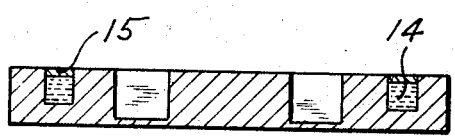
Figure 12A:
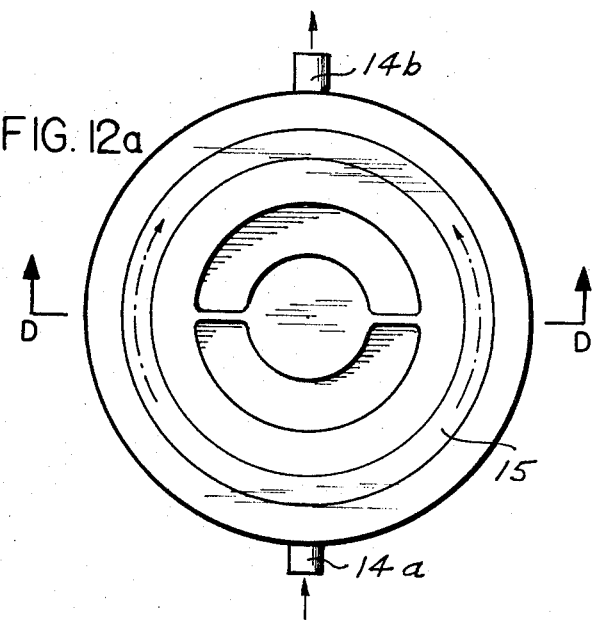

The invention will hereinafter be described, by way of example, with reference to the accompanying drawings in which FIG. 1a is a plan view of an embodiment of the element with two beams;

FIG. 1b is a view that is a cross-section of the embodiment taken along the line A—A in FIG. 1a, FIG. 1c is a view that is a cross section taken along line B—B in FIG. 1a, FIG. 2 is a diagram of a bridge connection for the strain gauges on the element, FIG. 3 is a horizontal view of an embodiment of the element with four beams, FIG. 4 is a vertical view and cross section of the element of FIG. 3, FIGS. 5 and 6 are vertical views and cross sections of embodiments with hermetic encasing of the beams and the strain gauges, FIGS. 7 and 8 are vertical views and cross sections of an embodiment with overload protection when the element is unaffected and affected, respectively, FIGS. 9 and 10 are horizontal views of embodiments different from the embodiments of FIGS. 1a and 3, FIG. 11a is a horizontal view of an embodiment for high natural frequency, FIG. 11b is a cross section view taken along line C—C of FIG. 12a, FIG. 12a is a horizontal view of an embodiment with channels for liquid cooling, and FIG. 12b is a cross section view taken along line D—D of FIG. 12b.

In FIGS. 1a – 1c an outside member 1 is shaped as a hole cylinder. Coaxially applied inside the outside member is an inside member 2 and said two members are in one of their ends attached to a membrane 3. The membrane is an integrated part of the members 1 and 2. Between the internal surface of the outside member and the external surface of the inside member are two, symmetrically along the periphery of e.g. the outside member applied, encastred measuring beams 4. The beams 4 are laminar shaped and have straight side surfaces. The beams are also located edgeways perpendicular integral with the membrane 3, i.e. coinciding with the plane of FIG. 1b. Then will each measuring beam in principle work as a beam encastred in one of its ends and on which beam the point of action is situated in the free, but parallel controlled other end. By the construction and the allocation of the respective beam, a pressure applied on the outside of the membrane will cause shear strains and then deformations in the beam. These deformations are sensed by strain gauges 5 applied to the beam, which strain gauges preferably are attached to the neutral axis of the beam in question so that they become essentially independent of the bending of the beam. FIG. 1b also shows an example of how the element, by the second end of the member 1, can be adapted to a mounting 6 or the like on the actual measuring object. In a plane perpendicular to the membrane 3 each beam 4 is rectangular or quadrangular.

Each measuring beam supports in the above-mentioned embodiment a strain gauge A, B, C or D on each of its side surfaces or faces. Each strain gauge is applied 45° in relation to the length direction of the beam and on the same beam the strain gauges are also applied 90° in relation to each other so that one strain gauge gets a positive dilatation for the measuring force in the beam and the other strain gauge gets a negative dilatation for the same force. The strain gauges can in accordance with this embodiment consist of so called Cross-Grid-gauges. The strain gauges are connected to each other in a known way in a bridge connection according to FIG. 2 which compensates for disturbances, if any, caused by side forces and the like. In addition to the strain gauges, the bridge connection comprises also an indicator I and a direct-current source. The indicator will in a known way indicate an electric signal which is proportional to an applied or resulting pressure.

The measuring beams are integrated with the outside and inside members 1 and 2 and the membrane 3 so that the element is made in a single unit. The membrane 3 and the measuring beams are dimensioned so that the latter ones will take up the essential part of the force which results from the pressure or the pressures. The table below displays the percentage of the applied force a membrane with the thickness of 0.5 mm will take up for the specific examples mentioned below.

| Measuring range kp/cm² | a mm | b mm | A mm² | u % |
|---|---|---|---|---|
| 5 | 30 | 20 | 3,1 | 8,2 |
| 10 | 30 | 20 | 6,3 | 4,1 |
| 20 | 19 | 13 | 5,0 | 8,2 |
| 50 | 19 | 13 | 12,0 | 3,3 |
| 100 | 9 | 5 | 5,6 | 14,8 |

The lengths $a$ and $b$ are shown in FIG. 1b, while A is the cross section area of the measuring beam.

The element is comparatively very flat, only 10 – 15 percent of the outer diameter of the outside member.

FIG. 3 discloses an embodiment according to FIG. 1a and 1b apart from the number of beams 4, which in this case is four. FIG. 4 illustrates that each beam is attached to (integrated with) the membrane 3 and extends to the height of the second ends of the members 1 and 2, e.g. the ends which are remote from the membrane.

FIG. 5 shows an embodiment in which hermetic encasing of the measuring beams 4 and the associated strain gauges is obtained by means of a further membrane 7 which is ring shaped. The outer edge of the ring is then attached to the outside member 2. This embodiment is suitable for measuring differential pressures, which from opposite directions act on the member 2 and the membranes 3 and 7. The pressure directions are indicated in FIG. 5, which also in principle shows the encastring of the transducer in particular case. As an alternative the hermetical encasing can be made by means of a further membrane which wholly covers the second end surfaces of the members 1 and 2 and which in FIG. 6 has the reference 8. The hermetically encased spaces according to FIGS. 5 and 6 can easily be evacuated.

FIGS. 7 and 8 display how the element can be provided with overload protection. In this case the outside member 1 passes the inside member by the second ends of the members. The element then is applied to a unit or a measuring object 9 having a smooth surface 9a which is able to co-operate with the inside member by the second end of this member. The movement of the membrane will be limited because of this co-operation, by which the inside member lies close (FIG. 8) to the mentioned surface 9a. The unit or the object 9 is by the smooth surface 9a provided with cavities 9b allocated opposite the beams 4. In this way the beams are prevented from being pressed against the smooth surface if they have irregularities from the manufacturing.

FIGS. 9 and 10 show modified embodiments of the measuring beams 4. FIG. 9 illustrates an embodiment especially advantageous in manufacturing by the fact that the side surfaces of each beam are concave in the cross section of the beam which runs in parallel with the membrane or with the paper plane of FIG. 9. The strain gauges are applied on the spots at which the beam is most thin. FIG. 10 illustrates an embodiment of the element which is useful for higher pressures. In this case the length of the beam has been enlarged in order to make it more easy to also apply the strain gauges on this element. The enlargement has been made by means of special cavities 10 and 11 which extend from the bottom to the top of the members 1 and 2 or only along a certain part of this height.

The embodiment of FIGS. 11a and 11b makes an element with high natural frequency possible. The inside member is then provided with apertures 12 and 13 which in their cross sections, which run parallel to the membrane or the plane of FIG. 11a, are allotted the shape of a sector. The apertures extend from the second end of the inside member and nearly along whole of the height of the same member.

The element can also be provided with a channel 14 for cooling liquid, e.g. water, which are shown by FIGS. 12a and 12b. The inlet or inlets of the channel is numbered with 14a, while the outlet has the reference 14b. The channel is made from a groove which is covered by a ring shaped membrane 15. Of course, the number of channels can be more than one.

It will be understood that many changes in the details of the invention are herein described and illustrated may be made without departing from the spirit thereof or the scope of the appended claims. For example the element is easy to adapt for measuring loads and forces. The number of beams can vary and in some cases three is a very desirable number. The element is made in stainless steel or any other suitable material.

I claim:

1. A transducer element comprising a tubular outer member, an inner member coaxially disposed within said outer member, a membrane integral with one end of each of said inner and outer members for maintaining said members in annularly spaced relationship, at least two shear strained beams integrally extending between said members, each of said beams being a thin plate integral with and perpendicular to said membrane, and strain gauges mounted on said beams.

2. The transducer element of claim 1 wherein the height of said members is between 10 and 15 percent of the outside diameter of said outer member.

3. The transducer element of claim 2 wherein there are at least three beams.

4. The transducer element of claim 1 wherein said thin plates are quadrilateral in shape.

5. The transducer element of claim 1 wherein the faces of the beams are concave in a cross sectional plane parallel to said membrane and said strain gauges are mounted in the region where the beams are the thinnest.

6. The transducer element of claim 1 wherein the regions where the beams are connected to the members, the members are cut back so as to increase the length of the beams.

7. The transducer element of claim 1 further comprising a second membrane disposed over the outer ends of said members to provide a sealed housing for said beams and strain gauges.

8. The transducer element of claim 1 wherein the height of said outer member is greater than said inner member to provide overload protection.

9. The transducer element of claim 1 wherein said outer member is provided with an internal channel for the passage of coolant.

10. The transducer element of claim 1 wherein said inner member is provided with sector shaped cavities to increase the natural frequency of the element.

* * * * *

UNITED STATES PATENT OFFICE
CERTIFICATE OF CORRECTION

Patent No. 3,869,906                    Dated March 11, 1975

Inventor(s) John Erik Andersson

It is certified that error appears in the above-identified patent and that said Letters Patent are hereby corrected as shown below:

On the Title page, the following should be added:

-- [30]   Foreign Application Priority Data
    Dec. 29, 1971          Sweden----------16790/71 --.

Signed and sealed this 13th day of May 1975.

(SEAL)
Attest:

RUTH C. MASON
Attesting Officer

C. MARSHALL DANN
Commissioner of Patents
and Trademarks